US010502277B2

(12) United States Patent
Masuda (10) Patent No.: US 10,502,277 B2
(45) Date of Patent: Dec. 10, 2019

(54) ELECTRIC BRAKE DEVICE WITH PARKING FUNCTION

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/814,093

(22) Filed: Nov. 15, 2017

(65) Prior Publication Data

US 2018/0073585 A1    Mar. 15, 2018

Related U.S. Application Data

(63) Continuation of application No. PCT/JP2016/063799, filed on May 10, 2016.

(30) Foreign Application Priority Data

May 19, 2015    (JP) ................................. 2015-101462

(51) Int. Cl.
   *F16D 127/06*    (2012.01)
   *F16D 65/18*    (2006.01)
   (Continued)

(52) U.S. Cl.
   CPC .............. *F16D 65/18* (2013.01); *B60T 13/74* (2013.01); *B60T 13/741* (2013.01);
   (Continued)

(58) Field of Classification Search
   CPC .. F16D 65/18; F16D 2121/24; F16D 2125/40; F16D 2127/06;
   (Continued)

(56) References Cited

U.S. PATENT DOCUMENTS 4,809,824 A * 3/1989 Fargier ...................... B60T 8/32
                                                    188/72.8
6,315,092 B1 * 11/2001 Schwarz ............... B60T 13/741
                                                    188/162
(Continued)

FOREIGN PATENT DOCUMENTS

CN           1748097 A    3/2006
DE    102011086149 A1    2/2013
(Continued)

OTHER PUBLICATIONS

International Search Report dated Jul. 5, 2016 in corresponding International Patent Application No. PCT/JP2016/063799.
(Continued)

*Primary Examiner* — Thomas W Irvin (57) ABSTRACT

A parking brake mechanism achieves a parking brake function using a friction material operation mechanism driven by a main brake motor. The parking brake mechanism includes a parking brake motor provided coaxially with one of rotational shafts transmitting a torque from the main brake motor to the friction material operation mechanism. A linear motion mechanism moves a rotor of the motor and an engaging mechanism. The engaging mechanism includes a rotor-side engaging portion and a housing-side engaging portion engaging with each other when the rotor is moved linearly to a predetermined position by the linear motion mechanism. Engagement of the engaging mechanism achieves a pressing force holding function of holding an angle of the rotational shaft against a reaction force of the pressing force of a friction material.

5 Claims, 8 Drawing Sheets

(51) Int. Cl.
*B60T 13/74* (2006.01)
*B60T 17/22* (2006.01)
*F16D 121/24* (2012.01)
*F16D 125/40* (2012.01)
*F16D 131/02* (2012.01)

(52) U.S. Cl.
CPC ............ *B60T 13/746* (2013.01); *B60T 17/22* (2013.01); *B60T 2270/402* (2013.01); *F16D 2121/24* (2013.01); *F16D 2125/40* (2013.01); *F16D 2127/06* (2013.01); *F16D 2131/02* (2013.01)

(58) Field of Classification Search
CPC ......... F16D 2127/213102; B60T 13/74; B60T 13/741; B60T 13/746; B60T 17/22; B60T 2270/402
See application file for complete search history.

(56) References Cited

U.S. PATENT DOCUMENTS

| | | | | |
|---|---|---|---|---|
| 7,677,367 | B2* | 3/2010 | Usui | ........................ F16D 65/18 188/156 |
| 7,810,616 | B2 | 10/2010 | Nakazeki | |
| 8,714,316 | B2* | 5/2014 | Hori | ...................... B60T 13/741 188/72.2 |
| 9,333,953 | B2* | 5/2016 | Masuda | .................. B60T 7/085 |
| 9,341,222 | B2* | 5/2016 | Masuda | ................ B60T 13/741 |
| 9,855,934 | B2 | 1/2018 | Yasui | |
| 2006/0032712 | A1* | 2/2006 | Kollaard | ................. F16D 28/00 188/72.8 |
| 2006/0169548 | A1* | 8/2006 | Corbett | ................... F16D 28/00 188/72.8 |
| 2008/0110704 | A1 | 5/2008 | Nakazeki | |
| 2015/0246662 | A1 | 9/2015 | Masuda et al. | |
| 2015/0330466 | A1 | 11/2015 | Masuda et al. | |
| 2016/0244035 | A1* | 8/2016 | Yasui | ...................... B60T 7/122 |

FOREIGN PATENT DOCUMENTS

| | | |
|---|---|---|
| JP | 2003-247576 | 9/2003 |
| JP | 2006-183809 | 7/2006 |
| JP | 2006-194356 | 7/2006 |
| JP | 2008-157378 | 7/2008 |
| JP | 2012-6423 | 1/2012 |
| JP | 2013-248946 | 12/2013 |
| WO | WO 2014/058015 A | 4/2014 |
| WO | WO 2014/088001 A1 | 6/2014 |
| WO | WO 2015/053180 A | 4/2015 |

OTHER PUBLICATIONS

English Language Translation of the International Preliminary Report on Patentability dated Nov. 30, 2017 in corresponding International Patent Application No. PCT/JP2016/063799.

Japanese Notification of Reasons for Refusal dated Dec. 11, 2018 in corresponding Japanese Patent Application No. 2015-101462 with English translation (6 pages).

Chinese Office Action dated Oct. 15, 2018 in Chinese Patent Application No. 201680028460.2 with English translation of Search Report (7 pages).

Chinese Office Action dated Mar. 15, 2019 in Chinese Patent Application No. 201680028460.2 with English translation (13 pages).

Extended and Supplementary Search Report dated Jan. 22, 2019 in European Patent Application No. 16796331.3.

* cited by examiner

ELECTRIC BRAKE DEVICE WITH PARKING FUNCTION

This application is a continuation application, under 35 U.S.C. § 111(a), of international application No. PCT/JP2016/063799, filed May 10, 2016, which is based on and claims Convention priority to Japanese patent application No. 2015-101462, filed May 19, 2015, the entire disclosure of which is herein incorporated by reference as a part of this application.

BACKGROUND OF THE INVENTION

Field of the Invention

The present invention relates to an electric brake device with parking function or parking function-equipped electric brake device where an electric brake device is provided with the function of a parking brake.

Description of Related Art

Regarding an electric brake device for which an electric motor is used, the following proposals have been made.

The proposal of an electric actuator for which a planetary roller screw is used (Patent Document 1).

The proposal of a parking brake mechanism in an electric brake device for which an electric motor, a linear motion mechanism, and a speed reducer or reduction gear are used (Patent Document 2).

The proposal of an electric brake device having the function of locking gears (Patent Document 3).

RELATED DOCUMENT

Patent Document

[Patent Document 1]: JP Laid-open Patent Publication No. 2006-194356

[Patent Document 2]: JP Laid-open Patent Publication No. 2006-183809

[Patent Document 3]: JP Laid-open Patent Publication No. 2003-247576

By locking a torque transmission mechanism such as the speed reducer as disclosed, for example, in Patent Documents 2 and 3, in the electric brake device for which the electric actuator is used as in Patent Document 1, it is possible to implement the parking brake function in an automobile. At this time, the implementation with reducing or saving space is required. For the above-described electric brake device, the configuration of a redundant system in the event of motor failure is considered as a problem. For example, in the examples shown in the above patent documents, two systems of power sources such as motors may be required, which may cause a problem in terms of cost and mounting space.

SUMMARY OF THE INVENTION

An object of the present invention is to provide a parking function-equipped electric brake device capable of implementing a parking brake function in a reduced or saved space. Another object of the present invention is to allow a redundant function for the electric brake device in the event of failure in the main brake motor.

Hereinafter, in order to facilitate understanding of the present invention, the present invention will be described with reference to the reference numerals in embodiments for the sake of convenience.

A parking function-equipped electric brake device according to the present invention includes:

a brake rotor 1; a friction material 2 configured to be brought into contact with the brake rotor 1; a friction material operation mechanism 3 configured to bring the friction material 2 into contact with the brake rotor 1; an electric main brake motor 4 configured to drive the friction material operation mechanism 3; a parking brake mechanism 5 configured to achieve a parking brake function by using the friction material 2 and the friction material operation mechanism 3; a housing 6; and a control device 7 configured to perform control of a braking force generated by the main brake motor 4 and control of the parking brake mechanism 5, wherein the parking brake mechanism 5 includes:

an electric parking brake motor 9 provided coaxially with one of rotational shafts 4c, 16, 27 that transmit a torque from the main brake motor 4 to the friction material operation mechanism 3;

a linear motion mechanism 33 configured to move a rotor 9a of the parking brake motor 9 in an axial direction of the rotational shaft 4c, 16, 27 to which the parking brake motor 9 is mounted; and an engaging mechanism 34 including a rotor-side engaging portion 34a provided to the rotor 9a of the parking brake motor 9, and a housing-side engaging portion 34b, provided in the housing 6, that engages with the rotor-side engaging portion 34a so as to prevent rotation of the rotor 9a when the rotor 9a is moved linearly to a predetermined position by the linear motion mechanism 33, engagement of the engaging mechanism 34 achieving a pressing force holding function of holding an angle of the rotational shaft against a reaction force of a pressing force of the friction material 2.

According to the electric brake device having this configuration, the parking brake mechanism 5 that achieves a parking brake function by using the friction material 2 and the friction material operation mechanism 3 is provided. Accordingly, the electric brake device can be provided with the function of a parking brake. In that case, the parking brake motor 9 is provided coaxially with one of the rotational shafts that transmit a torque from the main brake motor 4 to the friction material operation mechanism 3, so that it is possible to implement the parking brake function in a reduced space.

Here, the "rotational shafts that transmit a torque from the main brake motor 4 to the friction material operation mechanism 3" refer to a rotational shaft 4c of the main brake motor 4, a rotational shaft 16 of the friction material operation mechanism 3, and the rotational shafts of rotational bodies in a gear train or the like that transmit a torque from the main brake motor 4 toward the friction material operation mechanism 3. In addition, the above-described "coaxially" encompasses not only having a common axis, but also sharing an actual shaft.

In the present invention, the parking brake motor 9 and the main brake motor 4 may be disposed coaxially. When the main brake motor 4 and the parking brake motor 9 are coaxial, the shared use of the housing 6 and bearings can bring about advantages such as a further space saving, and a reduction in the number of components, and a reduction in the required torque for use in a redundant system which will be described later.

In the present invention, the linear motion mechanism 33 of the parking brake mechanism 5 may have an operation switching function which causes the rotor 9a and the rotational shaft 4c to rotate in synchronization by a torque of the parking brake motor 9 when a reaction torque of a pressing force of the friction material 2 is less than or not greater than a predetermined value, and causes the rotor 9a to move the rotational shaft 4c in the axial direction by the linear motion mechanism 33 when the reaction torque is greater than or not less than the predetermined value. It is possible to enhance the redundancy by adopting a structure in which the rotational shaft 4c is rotated in synchronization with the parking brake motor 9 until a predetermined brake reaction force is generated by the parking brake motor 9.

In the above-described invention, the linear motion mechanism 33 may be formed with a screw structure provided between the rotor 9a of the parking brake motor 9 and the rotational shaft 4c. With the screw structure, a linear motion mechanism 33 can be achieved with a simple structure. Here, the "screw structure" indicates all mechanisms that include a sliding groove having a predetermined inclination angle relative to the axial direction, and includes, for example, a groove having a very large equivalent lead, and a partial screw structure including a groove at a predetermined location.

In the case of the above-described screw structure, the operation switching function may be implemented by a frictional force generated on a thread face of the screw structure. By utilizing the frictional force generated on the thread face, the operation switching function can be implemented with a simple configuration.

In the present invention, the control device 7 may have a redundant function of driving the friction material operation mechanism 3 by using the parking brake motor 9 when a functional failure of the main brake motor 4 occurs. The parking brake mechanism 5 is configured to drive the friction material 2 and the friction material operation mechanism 3, which are driven by the main brake motor 4, by using the parking brake motor 9, to achieve a parking brake function. Accordingly, in the event of the failure, the redundant function in which the parking brake motor 9 is used as a replacement for a normal brake can be implemented by a simple configuration.

In the present invention, the parking function-equipped electric brake device may have parking-brake-motor direct driver 45 configured to drive the parking brake motor 9 without intervention of the control device 7 when a functional failure of the control device 7 occurs. The provision of the parking-brake-motor direct driver 45 that performs driving of the parking brake motor 9 without intervention of the control device 7 makes it possible to achieve a redundant function for preventing a failure of the brake function by operating the parking brake motor 9 as a replacement for a normal brake even when a functional failure of the control device 7 occurs.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
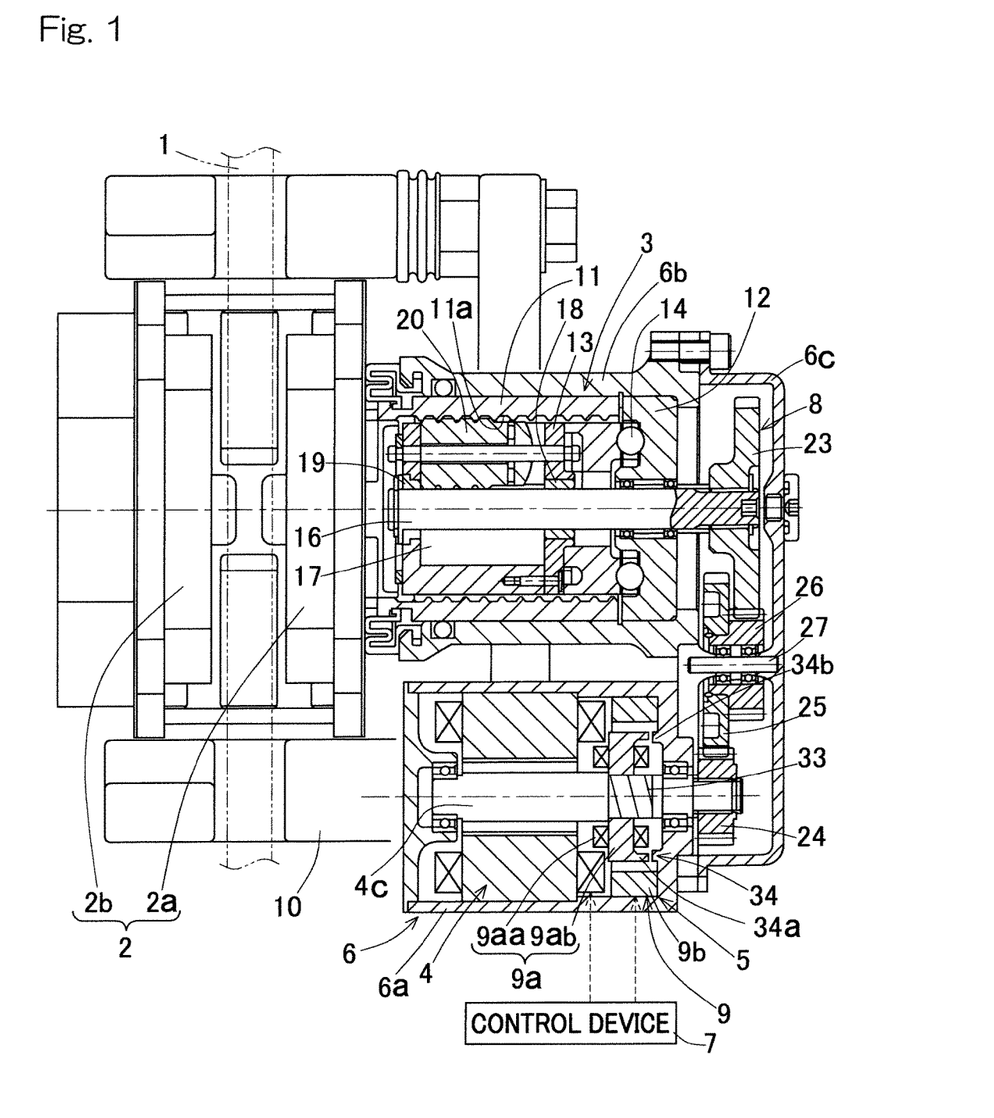
FIG. 1 is a cross-sectional view of a parking function-equipped electric brake device according to an embodiment of the present invention.

As shown in FIG. 1, the parking function-equipped electric brake device includes a brake rotor 1, a friction material 2 that is to be brought into contact with the brake rotor 1, a friction material operation mechanism 3 that brings the friction material 2 into contact with the brake rotor 1, an electric main brake motor 4 that drives the friction material operation mechanism 3 via a speed reducer 8, a parking brake mechanism 5 that achieves a parking brake function by using the friction material 2 and the friction material operation mechanism 3, a housing 6, and a control device 7 that performs control of the braking force by the main brake motor 4 and control of the parking brake mechanism 5.

In this example, the friction material 2 is composed of a pair of brake pads 2a and 2b that respectively confront or face opposite sides of the brake rotor 1. The two brake pads 2a and 2b are installed in a fixed member in which the housing 6 is installed, via a guide member, so as to be advanced or retracted freely in a direction in which they oppose each other, and one brake pad 2a is advanced or retracted by the friction material operation mechanism 3. The other brake pad 2b is moved in conjunction with and so as to oppose the one brake pad 2a by an interlocking mechanism (not shown), thus clamping the brake rotor 1 with the brake pads 2a and 2b. The housing 6 is composed of a motor portion housing portion 6a, a friction material operation mechanism housing portion 6b, and a speed reducer housing portion 6c.

Figure 2:
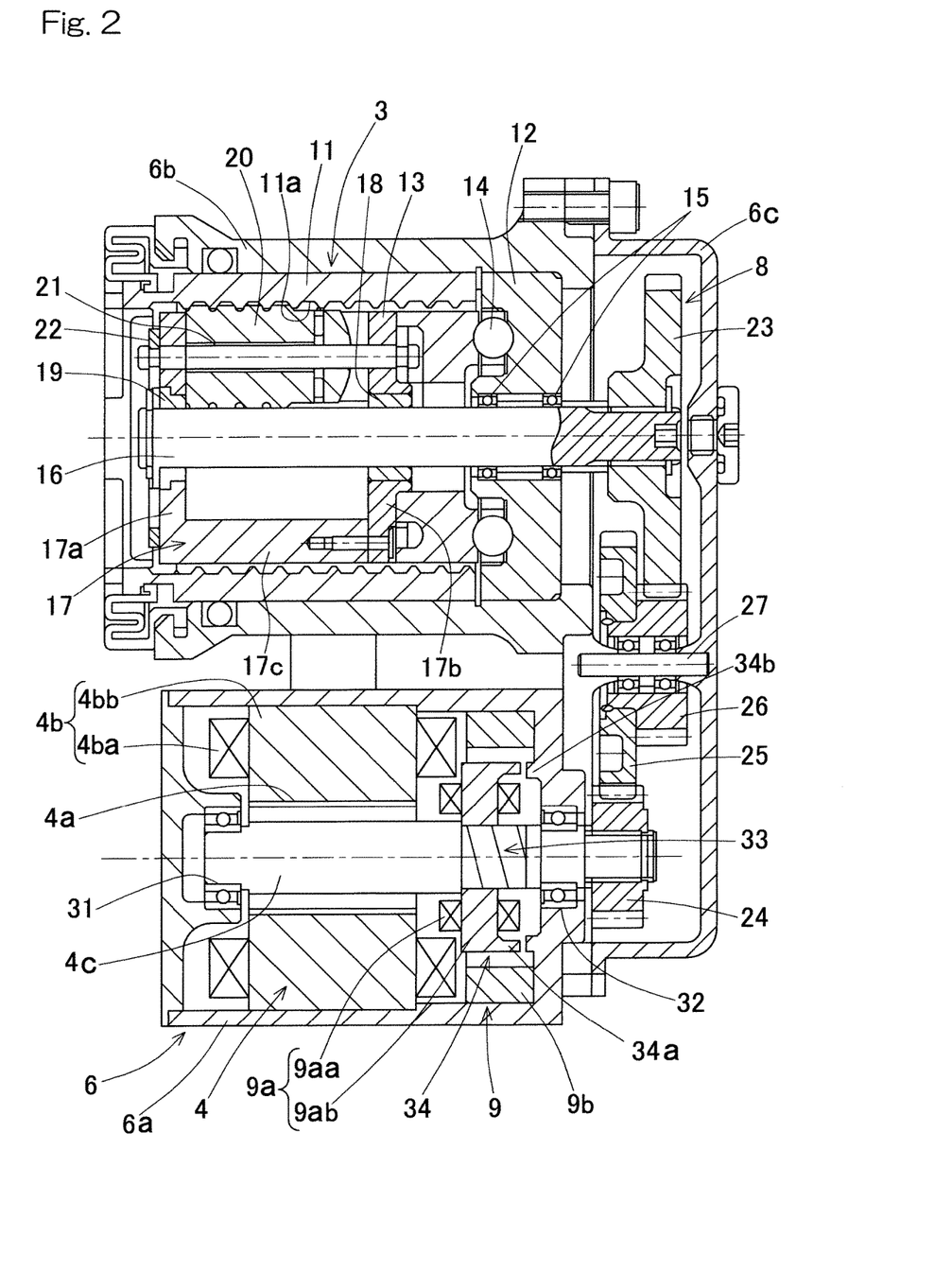
FIG. 2 is an enlarged cross-sectional view of FIG. 1 in which its part is omitted.

As shown in FIG. 2, in enlarged manner, the friction material operation mechanism 3 includes a portion serving as a linear motion mechanism that converts a rotary motion that is output from the electric main brake motor 4 via the speed reducer 8 into a linear motion to advance or retract the friction material 2, and a portion constituting a planetary speed reducer. The friction material operation mechanism 3 includes a slide member 11, a bearing member 12, an annular thrust plate 13, a thrust bearing 14, rolling bearings 15, 15, a rotational shaft 16, a carrier 17, and first and second slide bearings 18, 19. The slide member 11 is of a cylindrical shape and supported on the inner circumferential surface of the friction material operation mechanism housing portion 6b of the housing 6 such that the slide member 11 is prevented from rotating and is movable in the axial direction. On the inner circumferential surface of the slide member 11, a helical projection 11a is helically formed so as to project by a predetermined length in the radially inward direction. A plurality of planetary rollers described below mesh with the helical projection 11a.

The bearing member 12 is provided at one end side, in the axial direction, of the slide member 11 in the housing 6. The bearing member 12 includes: a flange portion that extends radially outward; and a boss portion. The rolling bearings 15, 15 are fitted in the boss portion, and the rotational shaft 16 is fitted onto the inner diameter surface of an inner ring of each of the bearings 15, 15. Therefore, the rotational shaft 16 is rotatably supported by the bearing member 12 via the bearings 15, 15.

The carrier 17 is provided in the inner circumference of the slide member 11 so as to be rotatable about the rotational shaft 16. The carrier 17 has a first disk 17a and a second disk 17b opposing to or facing each other in the axial direction. The second disk 17b close to the bearing member 12 side may be referred to as an inner disk 17b, and the first disk 17a away from the bearing member 12 may be referred to as an outer disk 17a. A distance adjustment member 17c is provided on a principal surface, of two principal surfaces of the first disk 17a, that faces the second disk 17b so as to project in the axial direction from the outer circumferential edge portion of this principal surface. A plurality of the distance adjustment members 17c are arranged so as to be spaced from each other in the circumferential direction such that distances between the plurality of planetary rollers 20 are adjusted. The first and second disks 17a, 17b are integrated by the distance adjustment members 17c.

The second disk 17b is supported by the first slide bearing 18 that is fitted between the second disk 17b and the rotational shaft 16 so as to be movable in the axial direction and rotatable. The first disk 17a has a shaft insertion hole formed at the center thereof and the second slide bearing 19 is fitted into the shaft insertion hole. The first disk 17a is rotatably supported by the rotational shaft 16 via the second slide bearing 19. A washer for receiving a thrust load is fitted to the end portion of the rotational shaft 16, and a retaining ring that prevents the washer from being removed is provided.

The carrier 17 has a plurality of roller shafts 21 provided spaced from each other in the circumferential direction. Opposite end portions of each roller shaft 21 are supported by the first and second disks 17a and 17b respectively. That is, each of the first and second disks 17a and 17b has a plurality of shaft insertion holes that are formed as oblong holes, and opposite end portions of each roller shaft 21 are inserted in the corresponding pairs of shaft insertion holes of the first and second disks 17a and 17b, whereby the roller shafts 21 are supported so as to be movable in the radial direction. An elastic ring 22 is extended over the plurality of roller shafts 21 so as to urge the plurality of roller shafts 21 toward the radially inward direction.

The planetary rollers 20 are rotatably supported by the roller shafts 21, respectively, and each planetary roller 20 is disposed between the outer circumferential surface of the rotational shaft 16 and the inner circumferential surface of the slide member 11. Each planetary roller 20 is pressed against the outer circumferential surface of the rotational shaft 16 by the urging force of the elastic ring 22 extended over the plurality of roller shafts 21. By rotation of the rotational shaft 16, each planetary roller 20 that is in contact with the outer circumferential surface of the rotational shaft 16 rotates due to contact friction therebetween. On the outer circumferential surface of each planetary roller 20, a helical groove is formed so as to mesh with the helical projection 11a of the slide member 11.

A washer and a thrust bearing (both of which are not shown) are disposed between the second disk 17b of the carrier 17 and one end portion, in the axial direction, of each planetary roller 20. In the housing 6b, the annular thrust plate 13 and the thrust bearing 14 are disposed between the second disk 17b and the bearing member 12.

The main brake motor 4 includes the main brake motor housing portion 6a of the housing 6, a rotational shaft 4c rotatably supported thereby via bearings 31, 32, a rotor 4a provided on the rotational shaft 4c, and a stator 4b that is located around the rotor 4a and installed in an inner circumference of the main brake motor housing portion 6a. In this example, the main brake motor 4 is a permanent magnet-type synchronous motor. The rotor 4a is made of permanent magnet, and the stator 4b is composed of a core 4bb and a coil 4ba. The main brake motor 4 is not limited to the synchronous motor, and may be an induction motor or a direct-current motor.

The speed reducer 8 will be described. The speed reducer 8 transmits the rotation of the main brake motor 4 to an input gear 23 fixed to the rotational shaft 16, by reducing a speed of the rotation (or number of rotation per unit time). The speed reducer 8 is composed of a gear train and the like. In this example, the speed reducer 8 reduces the rotation of an output gear 24 attached to the rotational shaft 4c of the main brake motor 4, and then allows the reduced rotation to be transmitted to the input gear 23 fixed to an end portion of the rotational shaft 16, via first and second transmission gears 25, 26 serving as rotational bodies. The first and second transmission gears 25, 26 are fixed or connected to each other in an integral manner, and are rotatably supported on a fixed support shaft 27. As described above, the transmission gears 25, 26 are supported on the fixed support shaft 27. However, when a rotational shaft common to the transmission gears 25, 26 is provided, and this rotational shaft is supported so as to be rotatable, this rotational shaft also corresponds to the rotational shaft recited in the claims.

The parking brake mechanism 5 will be described. The parking brake mechanism 5 includes a parking brake motor 9 that is provided coaxially with the main brake motor 4 and uses the rotational shaft 4c in common with the main brake motor 4, a linear motion mechanism 33 that moves the rotor 9a of the parking brake motor 9 in the axial direction of the rotational shaft 4c to which the parking brake motor 9 is mounted, and an engaging mechanism 34 that engages when the rotor 9a is moved linearly by the linear motion mechanism 33. With this engagement of the engaging mechanism 34, the parking brake mechanism 5 has a pressing force holding function of holding an angle of the rotational shaft 4c against a reaction force of the pressing force of the friction material 2 as will be described later.

In the illustrated example, the parking brake motor 9 includes a stator 9b made of permanent magnet, and a rotor 9a made of a coils 9aa and a core 9ab, and is configured as a brush DC motor that generates a rotating magnetic field via a brush or a slip ring (not shown). Note that a coil stator may be used in place of the stator 9b made of the permanent magnet. Apart from this, it is possible to use a brushless DC motor that does not use a brush, or use a stepping motor or an induction motor.

As for the placement of the parking brake motor 9, the illustrated example shows a case where the parking brake motor 9 is disposed coaxially with the main brake motor 4. However, the parking brake motor 9 may be disposed on any of rotational shafts that transmit a torque from the main brake motor 4 toward the friction material operation mechanism 3, including, for example, the rotational shaft in the case where the rotational shaft (not shown) is provided integrally with the gears 25, 26 of the speed reducer 8 in FIG. 1 or 2, and the input shaft 16 of the friction material operation mechanism 3.

When the parking brake motor 9 is mounted to the rotational shaft 4c of the main brake motor 4 as in the illustrated example, there are advantages such as a space saving and a reduction in the number of components and a reduction in the required torque for use in a redundant system which will be described later, due to sharing of the housing portion and the bearing between the main brake motor 4 and the parking brake motor 9. In contrast, when the parking brake motor 9 is disposed coaxially with the gears 25, 26 of the speed reducer 8 or the friction material operation mechanism 3, advantages such as an increase in the degree of freedom in design due to a reduction in the axial length of the motor, and a reduction in the influence of the inertia of the parking brake motor 9 can be achieved.

The linear motion mechanism 33 is formed by a screw structure including a rotor 9a of the parking brake motor 9 and a rotational shaft 4c of the main brake motor 4. Here, the "screw structure" indicates all mechanisms including a sliding groove having a predetermined inclination angle relative to the axial direction, and includes, for example, a groove having an extremely large equivalent lead, and a partial screw structure including a groove at a predetermined location.

The engaging mechanism 34 is formed by a rotor-side engaging portion 34a provided to the rotor 9a of the parking brake motor 9, and a housing-side engaging portion 34b provided in the housing 6. The rotor-side engaging portion 34a is provided at one of opposite ends of the rotor 9a in a direction in which the rotor 9a is moved linearly by the linear motion mechanism 33. The engaging mechanism 34 has a shape that inhibits rotation of the rotational shaft 4c in a decompressive direction.

Figure 3A:
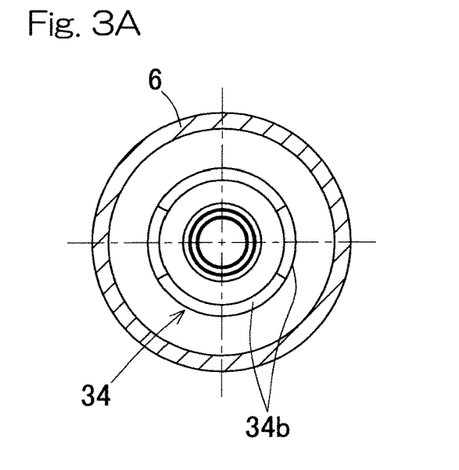
FIG. 3A is a left side view of a rotor opposing portion in a housing of a parking brake motor.
Figure 3B:
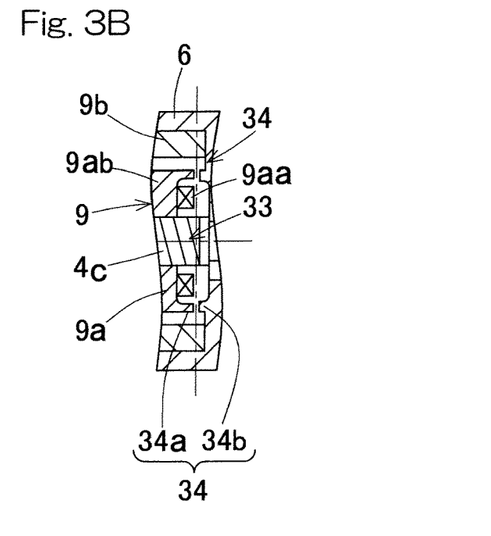
FIG. 3B is a cross-sectional view of the rotor and engaging portions thereof in the housing of the parking brake motor.
Figure 3C:
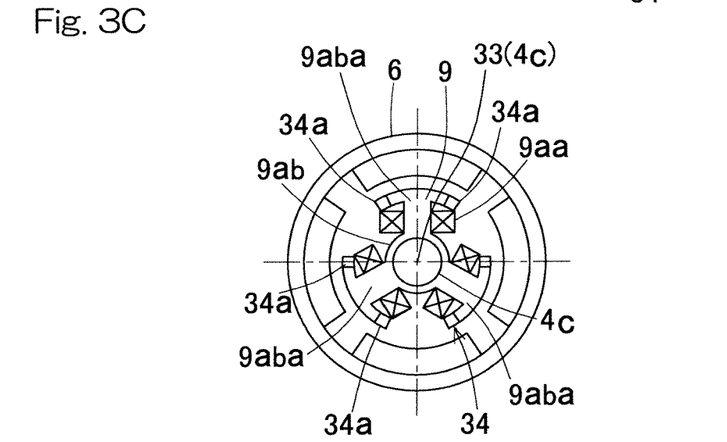
FIG. 3C is a right side view of the rotor in the housing of the parking brake motor.
Figure 4:
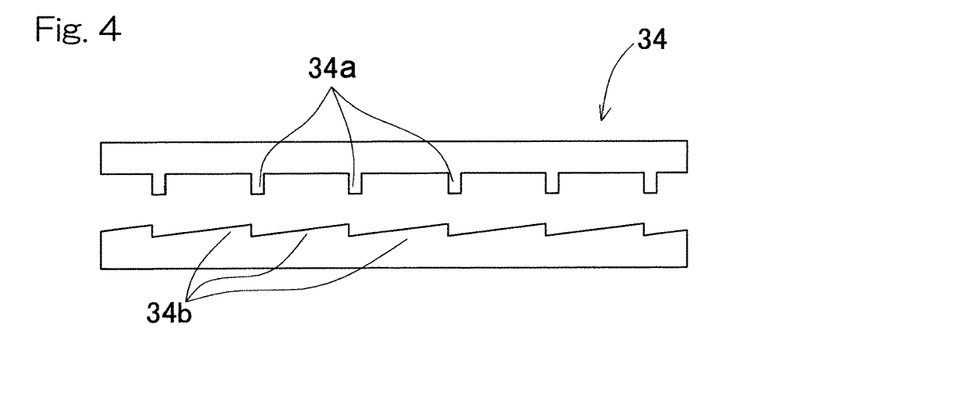
FIG. 4 is a diagram illustrating a developed view of the engaging portions.

FIGS. 3A to 3C show examples of specific shapes of the rotor-side engaging portion 34a and the housing-side engaging portion 34b that constitute the engaging mechanism 34. The core 9ab of the rotor 9a in the parking brake motor 9 includes a plurality of radially extending magnetic poles 9aba, and each of the magnetic poles 9aba is substantially T-shaped with its edge on the outer diameter side extending in a circumferential direction. The rotor-side engaging portions 34a protruding in the axial direction are formed as rectangular protrusions at opposite ends of the magnetic poles 9aba in the circumferential direction, on the edge on the outer diameter side. The housing-side engaging portions 34b are arranged in a ring shape so as to oppose the outer diameter edge of the core 9ab of the rotor 9a, and protrude from the motor portion housing portion 6a. As shown in FIG. 4, which is a developed view developed in the circumferential direction, a triangular shape that gradually protrudes in the circumferential direction in a tapered shape and falls in the axial direction at the most protruding end is repeated so as to be arranged in a saw-tooth configuration.

Figure 5A:
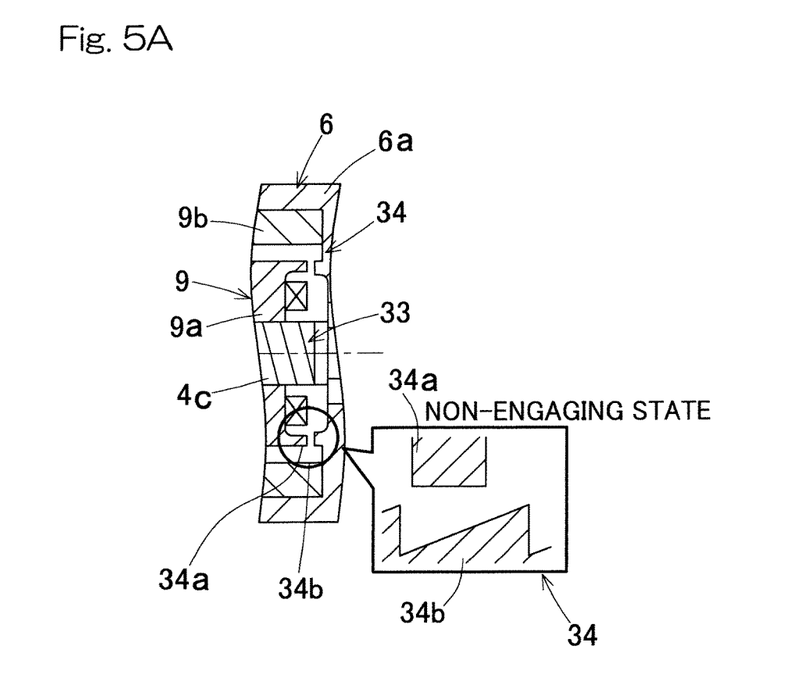
FIG. 5A is an explanatory diagram showing a non-engaging state of the engaging portions.

FIG. 5A shows a state in which the engaging mechanism 34 is separated, or in other words, a non-engaging state. At this time, when a rotational torque is generated in the parking brake motor 9, and the rotational shaft 4c of the main brake motor 4 has a resisting torque, for example, resulting from the reaction force of a brake pressing force, the rotor 9a of the parking brake motor 9 rotates along the thread of the linear motion mechanism 33 and moves in the axial direction.

Figure 5B:
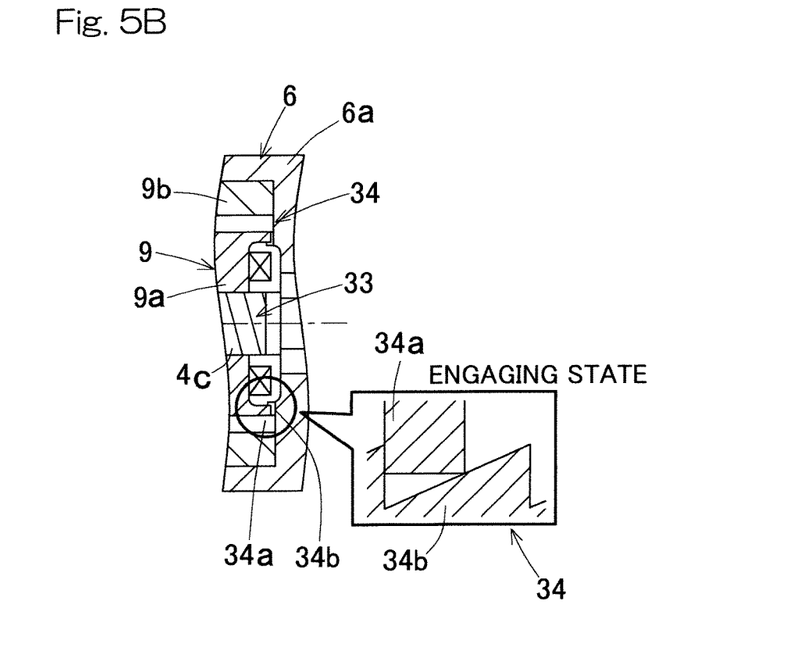
FIG. 5B is an explanatory diagram showing an engaging state of the engaging portions.

FIG. 5B is a diagram showing an engaging state of the engaging mechanism 34. The housing-side engaging portion 34b is provided at a destination point to which the rotor 9a of the parking brake motor 9 is moved in the axial direction, and has a shape that inhibits the rotation of the rotational shaft 4c of the rotor 9a in a decompressive direction. The rotor-side engaging portion 34a that is a protrusion provided at an outer circumferential portion of the rotor 9a of the parking brake motor 9 engages with the housing-side engaging portion 34b. Due to the screw structure of the linear motion mechanism 33, the movement of the rotor 9a of the parking brake motor 9 protruding further is inhibited by the bearing 32 (see FIG. 2) via a step of the rotational shaft 4c of the rotor 9a, thereby coming to a stop while the pressing force of the friction material 2 being maintained.

Figure 6:
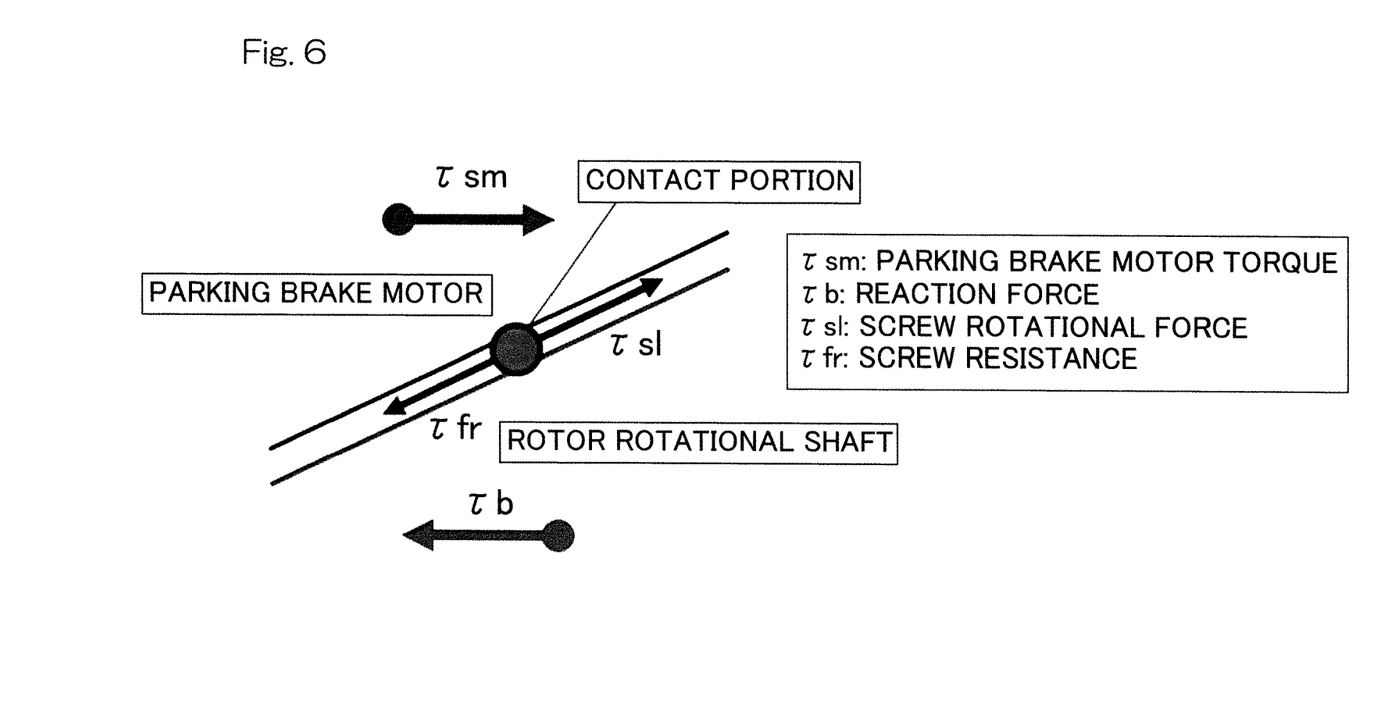
FIG. 6 is a diagram illustrating the forces acting on a linear motion mechanism of a screw structure in the parking function-equipped electric brake device.

FIG. 6 shows a concept of a static operation without involving acceleration and deceleration in the screw structure of the linear motion mechanism 33 in the parking brake mechanism 5 shown in FIGS. 5A and 5B. A slanted line at the center indicates an inclined contact surface in the screw structure between the rotor 9a of the parking brake motor 9 and the rotational shaft 4c shown in FIGS. 5A and 5B. That is, the slanted line shows an inclined contact surface between the internal thread on the inner circumferential surface of the rotor 9a and the external thread on the outer circumference of the rotational shaft 4c. For the sake of simplicity, the systems of units for various parameters are set in arbitrary dimensions including unit conversion factors. The screw rotational force $\tau_{sl}$ is given as follows from the torque of the parking brake motor 9 and the reaction force of the rotational shaft 4c by respectively multiplying a predetermined coefficient $\alpha$. The rotor rotational shaft reaction force is determined from the reaction force of the pressing force of the friction material 2, the torque of the main brake motor 4, the bearing resistance, and the like, of the electric brake device.

$$\tau_{sl} = \begin{cases} \alpha \tau_b & (|\tau_{sm}| \geq |\tau_b|) \\ \alpha \tau_{sm} & (|\tau_{sm}| < |\tau_b|) \end{cases} \qquad \text{[Math. 1]}$$

where $\tau_{sm}$: parking brake motor torque, $\tau_b$: reaction force

The screw resistance $\tau_{fr}$ indicates the force necessary to relatively rotate the linear motion mechanism 33 of the screw structure, and is determined mainly from the screw efficiency or the like. Alternatively, it is possible to adopt a structure in which a separate spring or the like is used to apply a preset torque. When a motor torque not less than a predetermined motor torque of the parking brake motor 9 is input under the condition where $\tau_{sl} > \tau_{fr}$, or in other words, in a state in which a predetermined load is present, the state of the rotor 9a of the parking brake motor 9 transitions from the state shown in FIG. 5A to the state shown in FIG. 5B, thus functioning as the parking brake mechanism 5.

Until the above-described condition is satisfied, the rotor rotational shaft 4c is rotated by the torque of the parking brake motor 9, and the parking brake motor 9 can perform the same friction material pressing operation as that performed by the main brake motor 4. Accordingly, by arbitrarily designing the $\tau_{fr}$, the parking brake motor 9 functions as a redundant system in the event of failure of the main brake motor 4. That is, the linear motion mechanism 33 has an operation switching function by which the rotor 9a and the rotational shaft 4c are rotated in synchronization by the torque of the parking brake motor 9 when the reaction torque of the pressing force of the friction material 2 is less than or not greater than a predetermined value, and the rotor 9a moves the rotational shaft 4c in the axial direction by the linear motion mechanism 33 when the reaction torque is greater than or not less than the predetermined value. Thus, by adopting a structure in which the rotational shaft 4c is rotated in synchronization with the parking brake motor 9 until a predetermined brake reaction force is generated by the parking brake motor 9, the parking brake motor 9 functions as a redundant system in the event of failure of the main brake motor 4.

Figure 7A:
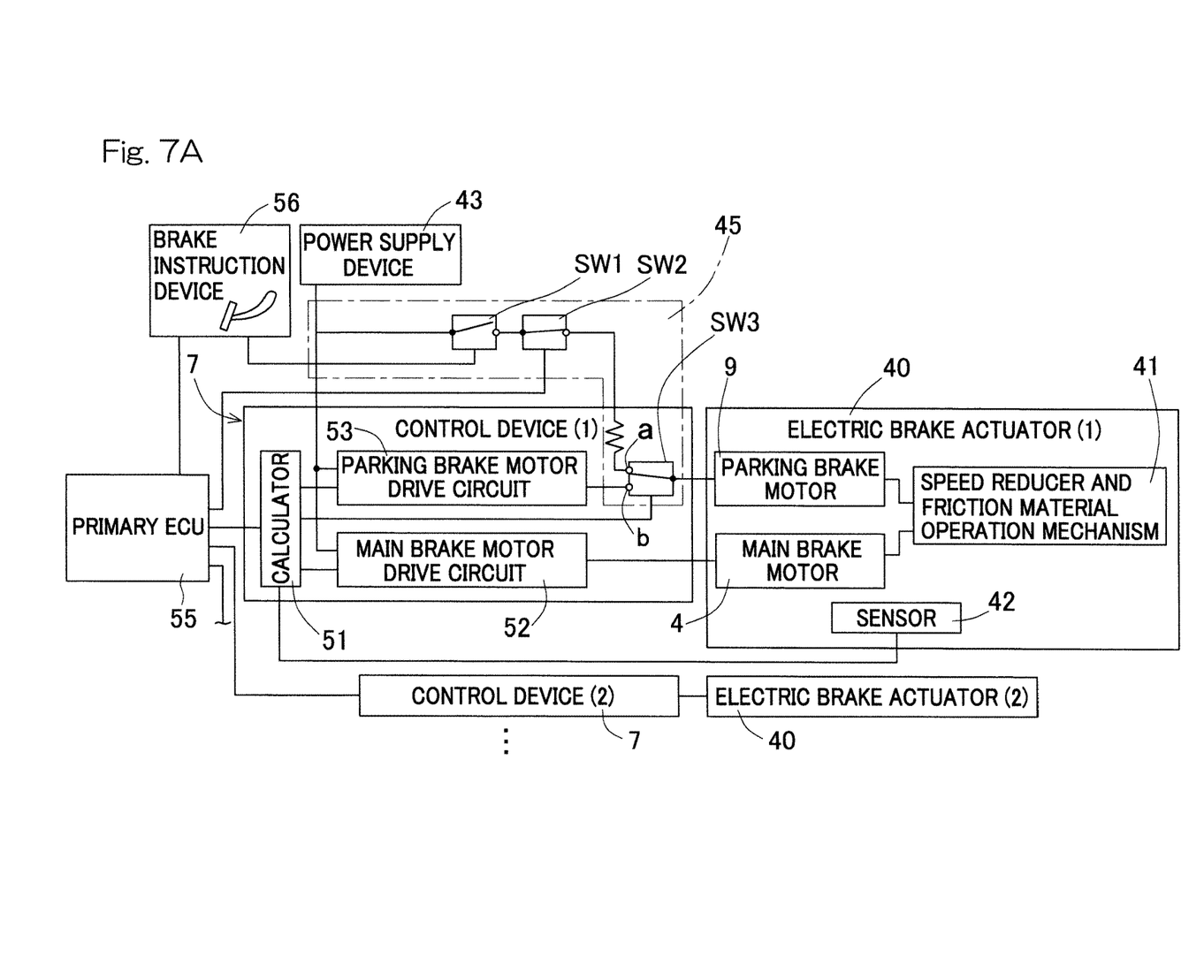
FIG. 7A is a block diagram of a conceptual configuration showing operating states of a control system in the parking function-equipped electric brake device.
Figure 7B:
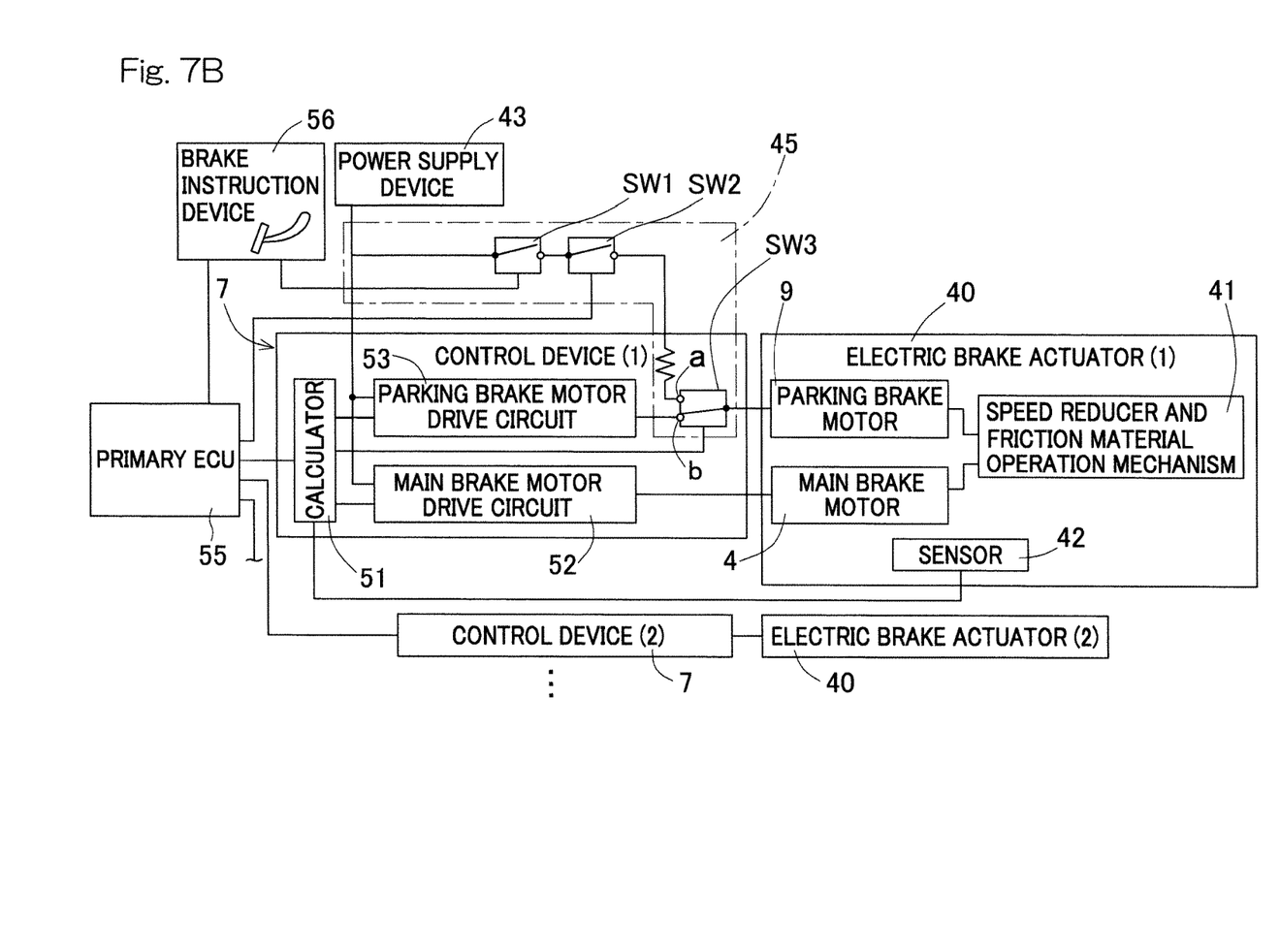
FIG. 7B is a block diagram of a conceptual configuration showing operating states of the control system in the parking function-equipped electric brake device.

FIGS. 7A and 7B are block diagrams showing the configuration of a control system. FIG. 7A shows the connection of the switching portions of switches SW1 to SW3 in a state in which the power supply is not turned on. FIG. 7B shows the same configuration and the connection of the switching portions of the switches SW1 to SW3 in a state in which the control device is normally functioning. The parking function-equipped electric brake device includes an electric brake actuator 40, which is a mechanical portion, and the control device 7 that controls the electric brake actuator 40. The electric brake actuator 40 includes the main brake motor 4, the parking brake motor 9, and a speed reducer and friction material operation mechanism 41. The speed reducer and friction material operation mechanism 41 is composed of the speed reducer 8 and the friction material operation mechanism 3, and is illustrated as a single block. The electric brake actuator 40 is provided with a sensor 42 including, for example, a motor angle sensor and a braking force sensor used for controlling the electric actuator.

The control device 7 includes a calculator 51, a main brake motor drive circuit 52, and a parking brake motor drive circuit 53. For convenience of illustration, the switch SW3 is illustrated within the block of the control device 7. Specifically, the main brake motor drive circuit 52 and the parking brake motor drive circuit 53 are circuits which receive input of instructions from the calculator 51, calculate the values of motor currents respectively supplied to the main brake motor 4 and the parking brake motor 9 by using a LUT (Look Up Table) implemented by software or hardware, or a predetermined transform function contained in a library of software or its hardware equivalent, etc., and control the motors. The main brake motor drive circuit 52 and the parking brake motor drive circuit 53 are connected to the power supply device 43, and on the output side to the motors, for example, an inverter circuit with a semiconductor bridge capable of outputting motor currents depending on the calculated motor current values is formed. The calculator 51 performs a predetermined calculation in accordance with an instruction from a primary ECU 55, and control the main brake motor 4 and the parking brake motor 9 via the main brake motor drive circuit 52 and the parking brake motor drive circuit 53. The calculator 51 may be formed by a computer including a processor, a ROM (Read Only Memory) containing a program executed by the processor and other electronic circuits such as a RAM (Random Access Memory) and a co-processor, for example.

In addition to connection of a current supply path via the parking brake motor drive circuit 53, the parking brake motor 9 is connected to the power supply device 43 via the switches SW1 to SW3, and the switches SW1 to SW3 constitute a parking-brake-motor direct driver 45 that drives the parking brake motor 9 without intervention of the control device 7. The first switch SW1 is normally open, and is switched to the closed side when a parking brake switch (not shown) constituting the brake instruction device 56 is on, and is switched to the open side when the parking brake switch is off The second switch SW2 is normally closed, and is switched to the open state when a normal diagnostic signal is on, the normal diagnostic signal being output if it is determined that there is no abnormality after abnormality diagnosis is performed on the control device 7 or the main brake motor 4 by abnormality diagnosis section (not shown) provided in the ECU 55, which will be described later. The third switch SW3 is normally closed on the side of a contact point a that is directly connected to the power supply device 43, and is closed on the side of a contact point b that is connected to the parking brake motor drive circuit 53 in accordance with a signal output by the calculator 51 at the time of using the parking brake mechanism 5 (see FIG. 7B). By providing the parking-brake-motor direct driver 45 in this manner, it is possible to achieve a redundant function of allowing the parking brake mechanism 5 to function even when a functional failure of the control device 7 or the main brake motor 4 occurs.

The primary ECU 55 is an electric control unit that performs centralized control or cooperative control of the entire vehicle, for example, and is also referred to as "VCU" (vehicle control unit). Each of the instructions from the brake instruction device 56 is input to the primary ECU 55, and then is input from the primary ECU 55 to the control device 7 of each parking function-equipped electric brake device. The brake instruction device 56 is a generic term for main brake operation portion such as a brake pedal and a parking brake switch, and is illustrated as a single block. Note that the parking function-equipped electric brake device is provided to each of the front, rear, left, and right wheels of a vehicle, and reference numerals "(1), (2) . . . " for distinguishing between individual parking function-equipped electric brake devices are added after the term "control device" and "electric brake actuator" in FIGS. 7A and 7B.

Figure 8:
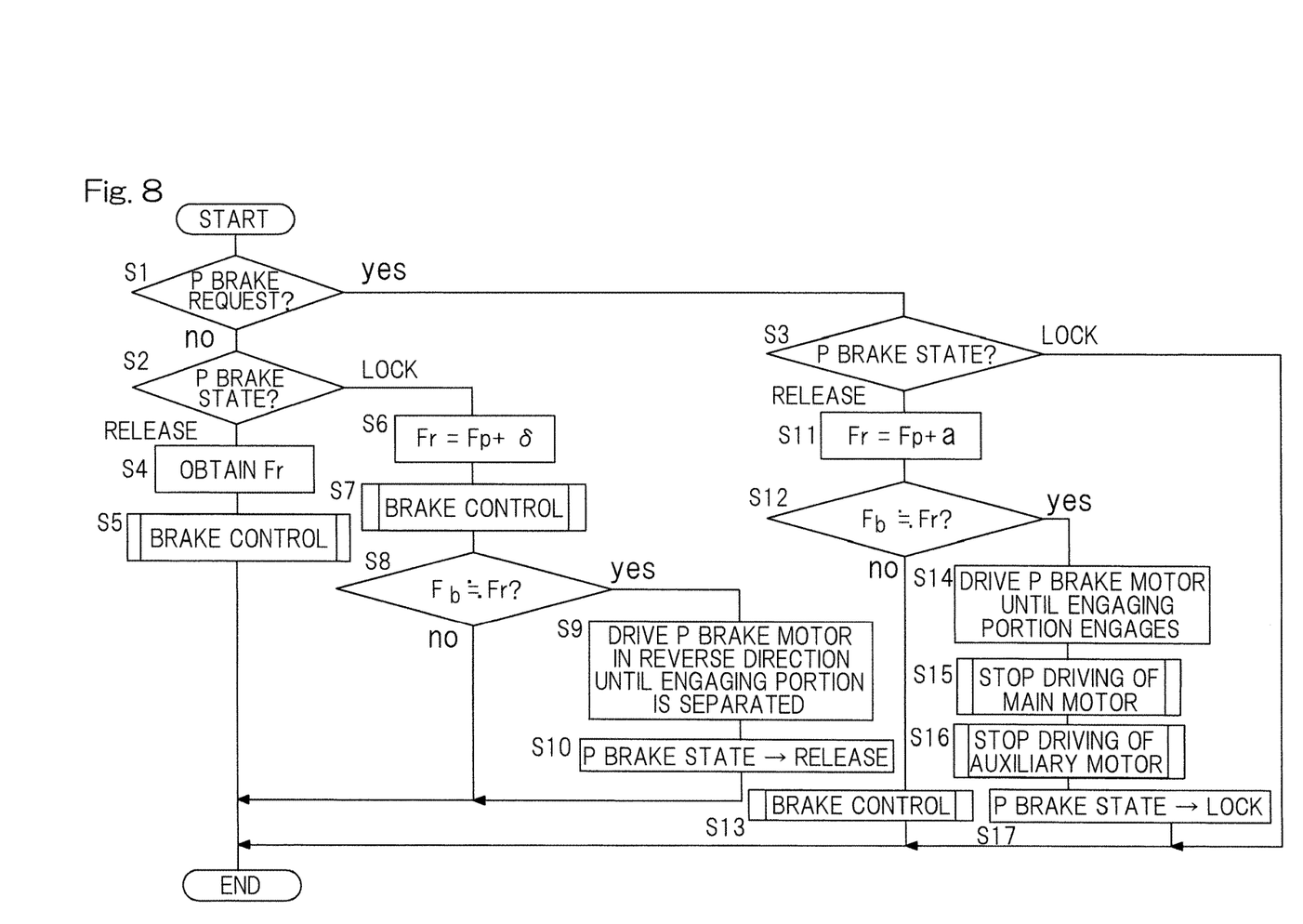
FIG. 8 is a flowchart illustrating operations of a controller of the parking function-equipped electric brake device.

FIG. 8 is a flowchart illustrating processes performed by the parking function-equipped electric brake device having the configuration according to the present embodiment, mainly showing processes performed by the calculator 51 shown in FIGS. 7A and 7B. The calculator 51 first determines whether there is a parking brake request (request to cause the parking brake mechanism 5 to function) that is instructed from the primary ECU 55 (step S1). In FIG. 8, for convenience of illustration, the term parking brake mechanism 5 or parking brake is described as "P brake", the main brake motor 4 is described as "main motor", and the parking brake motor 9 is described as "auxiliary motor" or "P brake motor". The parking brake request is a request, for example, that is input from the parking brake switch or the like of the brake instruction device 56 of the vehicle, and is output from the primary ECU 55, but may be a request that is determined and output in accordance with a predetermined condition by parking brake mechanism request section (not shown) provided in the primary ECU 55 at the time of stopping for a long time.

If there is a parking brake request (yes at step S1), the process proceeds to step S3, in which it is determined that the parking brake state is a locked state or a released state. When the parking brake state is the locked state, the process directly proceeds to "END", and returns to "START". When a parking brake request is input from the normal service brake state, or in other words, a state in which braking is performed by the main brake motor 4, and in which the parking brake mechanism 5 is in the released state, the process proceeds to step S11, in which a braking force target value Fr that is instructed to the main brake motor 4 is obtained by adding a predetermined value a to a parking brake force Fp (step S11), and controls the braking force (no in step S12 and subsequent S13). This is because the main brake motor 4 is slightly rotated in the reverse direction before completion of engagement and the braking force is slightly reduced, for example, in the structure shown in FIGS. 1 to 5B, and the predetermined value a is set as needed according to the structure of the engaging mechanism 5.

In this case, after the braking force has become a predetermined value Fb (yes in step S12), the parking brake motor 9 is driven to cause the rotor 9a (FIG. 2) to protrude, and, after completion of engagement (step S14), the operation of the motors are stopped (steps S15, S16), thus entering a parking brake completion state (locked state) (step S17).

If there is no parking brake request at the time of determination in step S1 (no in step S1), the process proceeds to step S2, in which whether the state is the parking brake state is determined. If there is no parking brake request, and the parking brake state is the locked state ("lock" in step S2), this indicates that a release request is made from the parking brake state. In this case, in order to separate the engaging mechanism, first, the braking force Fr is increased by a predetermined amount δ to perform control of the main brake motor 4 (steps 6, 7). Determination is made as to whether the braking force Fr has become a predetermined value Fb, and if it is determined that the braking force Fr has become a predetermined value Fb (yes in step S8), the parking brake motor 9 is driven in the reverse direction so as to separate the engaging mechanism 34 (step S9), and the parking brake state is released (step S10), thus returning the state to the normal service brake state, or in other words, the state in which braking is performed by the main brake motor 4.

If the parking brake mechanism 5 is in the released state at the time of determination in step S2, a target value Fr of the main brake motor 4 is obtained (step S4), and brake control by the main brake motor 4 is performed (step S5). The parking function-equipped electric brake device performs this series of operations. As can be understood from FIG. 8, the parking function-equipped electric brake device has a redundant function by which the control device 7 drives the friction material operation mechanism 3 by using the parking brake motor 9 when a functional failure of the main brake motor 4 occurs.

With the parking function-equipped electric brake device having the above-described configuration, the parking brake motor 9 is disposed coaxially with the rotational shaft 4c of the main brake motor 4 in this manner, so that the parking brake function can be implemented in a reduced space. In addition, the parking brake mechanism 5 has a structure in which a predetermined torque can be input to the rotational shaft 4c by the parking brake motor 9, so that the parking brake mechanism 5 can have a function of a redundant system in the event of failure of the main brake motor 4. That is, it is possible to enhance the redundancy because the parking brake mechanism 5 has a structure including an operation switching function in which the rotational shaft 4c is rotated in synchronization with the parking brake motor 9 due to a friction on the thread face of the linear motion mechanism 33 in the parking brake mechanism 5 until a predetermined brake reaction force is generated by the parking brake motor 9.

Although the present invention has been described above in connection with the preferred embodiments thereof with reference to the accompanying drawings, the embodiments disclosed herein are to be construed in all respects as illustrative and not limiting. The scope of the present invention is defined by the claims, rather than the above description. Those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . brake rotor
2 . . . friction material
2a, 2b . . . friction pad (brake pad)
3 . . . friction material operation mechanism
4 . . . main brake motor
4c . . . rotational shaft
5 . . . parking brake mechanism
6 . . . housing
6a . . . motor portion housing
6b . . . friction material operation mechanism portion housing
6c . . . speed reducer housing
7 . . . control device
8 . . . speed reducer
9 . . . parking brake motor
9a . . . rotor
9b . . . stator
16 . . . rotational shaft
33 . . . linear motion mechanism
34 . . . engaging mechanism
34a . . . rotor-side engaging portion
34b . . . housing-side engaging portion
40 . . . electric brake actuator
45 . . . parking-brake-motor direct driver
51 . . . calculator
52 . . . main brake motor drive circuit
53 . . . parking brake motor drive circuit
55 . . . primary ECU
56 . . . brake instruction device
SW1 to SW3 . . . switch

What is claimed is:

1. A parking function-equipped electric brake device comprising:
   a brake rotor;
   a friction material configured to be brought into contact with the brake rotor;
   a friction material operation mechanism configured to bring the friction material into contact with the brake rotor;
   an electric main brake motor configured to drive the friction material operation mechanism;
   a parking brake mechanism configured to achieve a parking brake function by using the friction material and the friction material operation mechanism;
   a housing; and a control device configured to perform control of a braking force generated by the main brake motor and control of the parking brake mechanism, wherein the parking brake mechanism includes:

an electric parking brake motor provided coaxially with one of rotational shafts that transmit a torque from the main brake motor to the friction material operation mechanism;

a linear motion mechanism configured to move a rotor of the parking brake motor in an axial direction of the rotational shaft to which the parking brake motor is mounted; and an engaging mechanism including a rotor-side engaging portion provided to the rotor of the parking brake motor, and a housing-side engaging portion, provided in the housing, that engages with the rotor-side engaging portion so as to prevent rotation of the rotor when the rotor is moved linearly to a predetermined position by the linear motion mechanism, engagement of the engaging mechanism achieving a pressing force holding function of holding an angle of the rotational shaft against a reaction force of a pressing force of the friction material, and the parking brake motor is disposed coaxially with the main brake motor, and can function redundantly to the main brake motor to rotate the rotational shaft.

2. The parking function-equipped electric brake device as claimed in claim 1, comprising parking-brake-motor direct driver configured to drive the parking brake motor without intervention of the control device when a functional failure of the control device occurs.

3. A parking function-equipped brake device comprising:

a brake rotor;

a friction material configured to be brought into contact with the brake rotor;

a friction material operation mechanism configured to bring the friction material into contact with the brake rotor;

an electric main brake motor configured to drive the friction material operation mechanism;

a parking brake mechanism configured to achieve a parking brake function by using the friction material and the friction material operation mechanism;

a housing; and a control device configured to perform control of a braking force generated by the main brake motor and control of the parking brake mechanism, wherein the parking brake mechanism includes:

an electric parking brake motor provided coaxially with one of rotational shafts that transmit a torque from the main brake motor to the friction material operation mechanism;

a linear motion mechanism configured to move a rotor of the parking brake motor in an axial direction of the rotational shaft to which the parking brake motor is mounted; and an engaging mechanism including a rotor-side engaging portion provided to the rotor of the parking brake motor, and a housing-side engaging portion, provided in the housing, that engages with the rotor-side engaging portion so as to prevent rotation of the rotor when the rotor is moved linearly to a predetermined position by the linear motion mechanism, engagement of the engaging mechanism achieving a pressing force holding function of holding an angle of the rotational shaft against a reaction force of a pressing force of the friction material, and the linear motion mechanism of the parking brake mechanism having an operation switching function which causes the rotor and the rotational shaft to rotate in synchronization by a torque of the parking brake motor when a reaction torque of a pressing force of the friction material is at least less than a predetermined value, and causes the rotor to move the rotational shaft in the axial direction by the linear motion mechanism when the reaction torque is at least greater than the predetermined value.

4. The parking function-equipped electric brake device as claimed in claim 3, wherein the linear motion mechanism is formed with a screw structure provided between the rotor of the parking brake motor and the rotational shaft.

5. The parking function-equipped electric brake device as claimed in claim 4, wherein the linear motion mechanism is configured such that the operation switching function is implemented by a frictional force generated on a thread face of the screw structure.

* * * * *